United States Patent [19]

Roller

[11] 4,125,448

[45] Nov. 14, 1978

[54] CELL AND ELECTRODES FOR ELECTROLYTIC PRODUCTION OF INSOLUBLE METAL HYDROXIDE

[76] Inventor: Paul S. Roller, 1440 N. St., NW. (#208), Washington, D.C. 20005

[21] Appl. No.: 674,099

[22] Filed: Apr. 20, 1976

Related U.S. Application Data

[63] Continuation-in-part of Ser. No. 444,790, Feb. 22, 1974, Pat. No. 3,960,695.

[51] Int. Cl.$^2$ .......................... C25B 9/04; C25B 1/16; C25B 11/04
[52] U.S. Cl. ............................... 204/268; 204/290 R; 204/96
[58] Field of Search .................. 204/280, 289, 227, 96, 204/290 R, 290 F, 288, 297 R, 281, 268

[56] References Cited

U.S. PATENT DOCUMENTS

| | | | |
|---|---|---|---|
| 993,776 | 5/1911 | Hoorickx | 204/297 R |
| 1,906,378 | 5/1933 | Howard | 204/297 R |
| 1,994,144 | 3/1935 | Merrill | 204/281 |
| 2,249,765 | 4/1941 | Hulse | 204/243 R |
| 3,108,939 | 10/1963 | Sabins | 204/290 F |
| 3,424,668 | 1/1969 | Fischer | 204/281 |
| 3,857,774 | 12/1974 | Morton et al. | 204/288 X |

Primary Examiner—John H. Mack
Assistant Examiner—D. R. Valentine

[57] ABSTRACT

In the electrolytic production in water of insoluble metal hydroxide from the metal thereof, more especially of coagulant ferric hydroxide from iron, rectangular channels with flanking ribs provide for pre-established, uniform spacing of the electrode plates and intermediate binary wiping structures. Electrolytic current contact is protected against corrosion by a metallic embossment on the plates. Binary reciprocating wipers are at different wiping levels between successive plates and reversely directed to the opposite surfaces thereof. The wipers are urged against the plate surface by bilateral springs, as the surfaces recede due to thinning of the plates as they are consumed. Terminal panels, on which the wipers land after a reciprocating stroke, coextensively bound the plates; protuberances facilitate the transit of a wiper between them. The terminal panels may be employed to concurrently generate oxygen or chlorine as a supplement to coagulant ferric hydroxide. An electrode plate is described that is stabilized against end corrosion.

10 Claims, 6 Drawing Figures

CELL AND ELECTRODES FOR ELECTROLYTIC PRODUCTION OF INSOLUBLE METAL HYDROXIDE

This application is a continuation-in-part of my co-pending application, Ser. No. 444,790, filed Feb. 2, 1974, now issued as U.S. pat. No. 3,960,695.

The invention relates to the electrolytic production of insoluble metal hydroxide in water from electrodes of the metal, and in particular to the production of iron hydroxide, a coagulant of suspended matter in water, from iron.

In an aqueous electrolytic cell of anodes and cathodes of a metal whose hydroxide is insoluble in water, the hydroxide is formed at the anode, while hydrogen is liberated at the cathode; the hydrogen is generally negligible. Examples of the metal in the field of water treatment, are iron and aluminum, of which the former is the most significant commercially. Iron forms at the anode ferrous hydroxide, which in the presence of oxygen in the water is instantly oxidized to ferric hydroxide. A coagulant of suspended matter in the water, the ferric hydroxide may also combine with phosphate in the water. Alternate to its production electrolytically, coagulant ferric hydroxide may be produced chemically, by the hydrolysis of ferric sulfate or chloride, or equivalently of aluminum sulfate.

All factors considered, iron to produce ferric hydroxide electrolytically is much cheaper than the equivalent chemical compounds; these are burdened with anion and water that greatly increase the ultimate user cost. Moreover, the electrolytic method has the advantage of avoiding acid and solubles added to the water.

Because of patent advantages of the electrolytic method, numerous attempts have been made to utilize it. These have, however, been nullified by augmenting power, due to an insulating, hard layer formed on the anode. I have previously found that, by removing a parent soft film, wiping of the electrode obviates the hard layer. The removal by wiping is greatly aided by reversal of the current, which may be considered an indispensable concomitant of the wiping; reversal of the current provides, moreover, for the same metal being employed both as anode and cathode.

As a metal plate is electrolytically consumed in producing the hydroxide, the surface of the plate recedes from the wiper; this, accordingly, is spring loaded. For spring-loaded wiping of an electrode plate to its very edges in reciprocating wiping, it is bounded by terminal panels on which the wipers may land at the end of a wiping stroke.

It is an object of the invention to provide for a least distance of separation of successive electrode plates, while including a wiper structure therebetween, whereby to reduce electrolytic resistance to a minimum.

Another object is to provide for self-controlled spacing of electrode plates and reciprocating wiper drive members therebetween.

Another object is to provide for wiping the opposite surfaces of successive electrode plates at an interplate distance no greater than that required for wiping but one surface.

A further object is to provide for stability of the wiper springs in reciprocating, spring-loaded wiping.

Still another object is to provide for unimpeded transit of wipers between an electrode plate and its bounding terminal panel.

An electrode plate is described that is stabilized against end corrosion and adapted to receive applied current.

A still further object is to provide for the generation of oxygen concurrently with the electrolytic production of metal hydroxide.

With these and other objects in mind, as will become apparent from the description which follows, reference is made to the figures, in which similar parts are similarly numbered, and in which.

Figure 1:
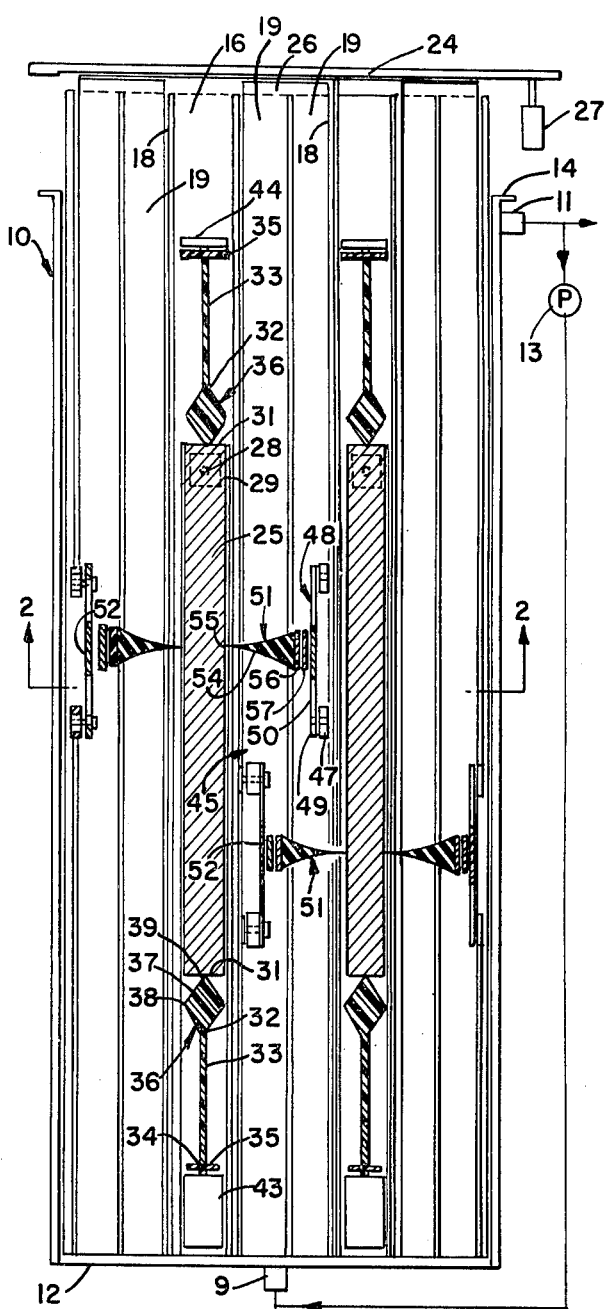
FIG. 1 is a view in elevation of the apparatus taken in mid-section.
Figure 2:
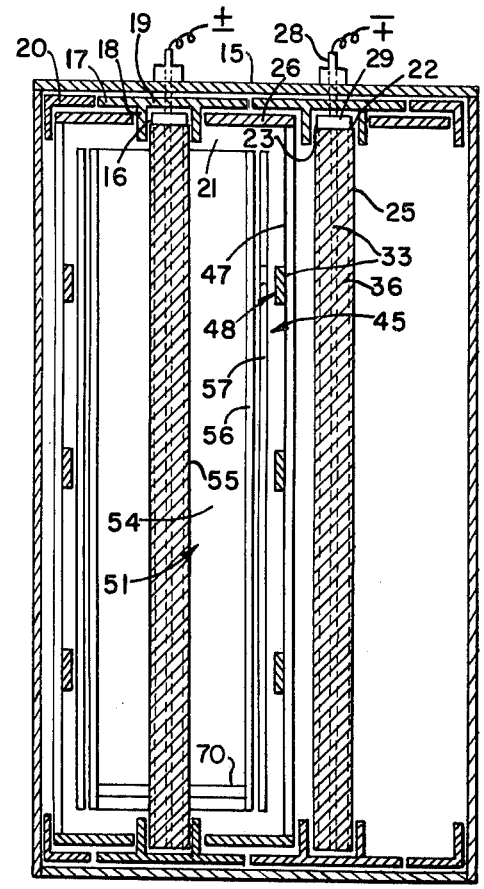
FIG. 2 is a plan view of the apparatus taken in section on line 2—2 of FIG. 1.
Figure 3:
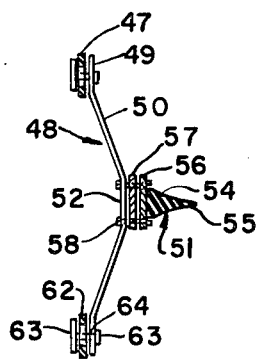
FIG. 3 is an end view showing a bilateral wiper spring.
Figure 4:
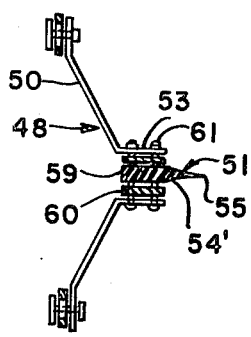
FIG. 4 is an end view showing a modification of said bilateral spring.
Figure 5:
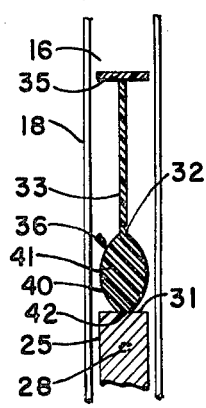
FIG. 5 is an end view showing a terminal panel and its bordering protuberance.
Figure 6:
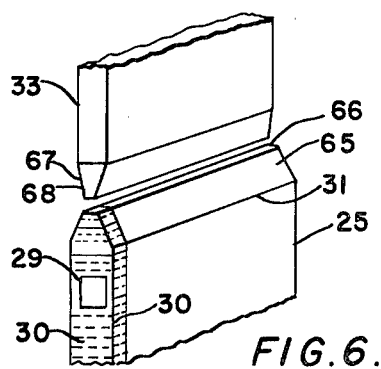
FIG. 6 is an isometric view illustrating an alternate electrode plate.

Having reference now to the figures, container 10 enclosing the electrolytic apparatus is provided with water inlet 9 on bottom 12 and water outlet 11 below rim 14. The water exiting in outlet 11 contains in suspension metal hydroxide, for example, coagulant ferric hydroxide; if this is to be concentrated, the water may be recirculated by pump 13 across the metal electrodes of the apparatus between outlet 11 and inlet 9.

A plurality of rectangular, matching channels 16, extending longitudinally from bottom 12 up to or above rim 14, is mounted at channel bases 17 on opposite side walls 15 of container 10, with channel walls 18 jutting inwardly of said container. Ribs 19, projecting from base 17, flank channel walls 18; and, successively in abutment, forms bases 20 of longitudinal, matching recesses 21, the walls of which are identical with walls 18 of channels 16.

Side ends 22 and adjacent margins 23 of the flat surfaces of electrode plates 25 are retained in matching channels 16. Reciprocating wiper drive members 26 are situated in recesses 21 intermediate successive electrode plates 25. Matching channels 16 and recesses 21 provide for pre-established, uniform spacing of the plurality of electrode plates 25 and of intermediate wiper structures based on wiper drive members 26; these extend from below electrode plate 25 to above rim 14, whence they latch to beams 24. Power source 27, communicating with said beams, provides a longitudinally reciprocating motion to said wiper drive members.

Electrolytic current lead-ins 28 penetrate side wall 15 of container 10 and base 17 of channel 16 to make electrical contact with side ends 22 of those electrode plates 25 that directly receive applied electrolytic current. Other electrode plates 25 are uncontacted; these receive electrolytic current indirectly as members of a series.

At the contact between current lead-in 28 and electrode plate 25, metal of the latter, copper, silver, magnesium, aluminum or iron, tends to corrode. This effect, which leads to an increasing resistance, is circumvented by the addition of mark or contact element 29 of non-corrodible metal to said electrode plate. In terms of the apparatus as described and electrode plate 25 being rectangular, mark 29 is situated on side end 22 thereof, at which site contact is made between said mark and current lead-in 28. The non-corrodible metal comprising mark 29 may be generally an alloy of nickel-chromium-iron or titanium.

Mark 29 may be in the form of an embossment, such as that produced by welding or an inlay, such as that produced by an inserted pin or screw, of by fill in of a cavity. In either case, mark 29 may lie within the edges of side end 22, reach to the edges or overlap them.

Being protected while in channel 16 from reversing electrolytic current, side ends 22 and adjacent margins 23 of electrode plate 25 tend to corrode. In order to stabilize the electrode plate against this corrosion, said side ends and adjacent margins may be coated with an insulating film that is resistant to water, such a film being, for example, of a vinyl, epoxy or asphaltic composition. When mark 29 is present, however, the insulating film falls short of it.

During electrolytic operation, electrode plate 25 thins, while side ends 22 and adjacent margins 23 that have been coated remain intact. That part of said adjacent margins that projects from channel 16 will then be thicker than electrode plate 25; it thus constitutes a barrier to the passage of wiper 51. In order to overcome this effect, the respective ends of wiper 51 may be incised, whereby wiper fillets 70 are formed. These facilitate the wiping by gliding over said projecting, adjacent margins and so leaving the remainder of wiper 51 undisturbed by the presence of the projecting, adjacent margins.

Ends 31 of electrode plate 25 transverse to channels 16 may be adjacent the similarly transverse ends 32 of coextensive, bounding terminal panels 33. These being comparatively thin, a shaped strip or protuberance 36 borders terminal panels 33 at said transverse end 32 and interposes it and said transverse end 31, to which it is contiguous. Protuberance 36 is of rigid, dielectric material, while terminal panel 33, which it borders, is rigid, and generally, though not necessarily, dielectric. Tee bar 35, which as reinforcement borders terminal panel 33 at its transverse end 34 opposite protuberance 36, is rigid, and also generally, though not necessarily, dielectric.

Protuberance 36 has a maximum mid-thickness equal to that of electrode plate 25; from the corresponding summit, the thickness decreases to a verge at one end equal to the thickness of terminal panel 33, and to a verge at the other end equal to the thickness of a consumed, remnant electrode plate 25.

Protuberance 36 is in a preferred form represented by prism 37, whose maximum mid-thickness is the distance between opposite vertices 38, the edges of which may be blunted; from said vertices as summits, the sides of prism slope to opposite vertices 39 as said verges. In an alternate form, protuberance 36 is represented by cylindroid 40, which may reduce to a cylinder, whose maximum mid-thickness is the distance between oblate ends 41 and whose verges are prolate ends 42.

Terminal panels 33 fit snugly in channels 16, through protuberance 36 and tee bar 35 abutting walls 18 of said channels. From the under end of lower terminal panel 33, tee bar 35 rests against foot-supports 43 situated in matching channels 16 on bottom 12 of container 10. Lid 44 in matching channels 16 presses on tee bar 35 of upper terminal panel 33; transmitted to foot-support 43, the lid pressure serves to secure electrode plate 25 and bounding terminal panels 33 in said channels.

Binary wiper structure 45 is intermediate successive electrode plates 25 and consists of two components, which are quite similar, but distinguished by their wipers being at different longitudinal levels and reversely directed to the opposite surfaces of said electrode plates. Each said component comprises: a wiper backing represented by two longitudinally separated backing strips 47, adjacent a plate surface and extending transversely between wiper drive members 26 to which they are attached in channels 16; a plurality of planar, bilateral springs 48, extending uniformly along backing strips 47 and connected across them at spring ends 49; and a wiper 51, extending transversely between walls 18 of matching channels 16 and connected to said bilateral springs, which urge said wiper against a plate surface opposite that adjacent said backing strips. The clearance between backing strips 47 and the adjacent plate surface and between successive bilateral springs 48 along said backing strips allows for the passage of water flowing between electrode plates 25.

Bilateral springs 48 include spring arms 50, which project obliquely from spring ends 49 to a mid-part, from which is transmitted the force of the spring to wiper 51. In a preferred form, said mid-part is a longitudinal length 52 of said spring, extending between the ends of spring arms 50; alternately, it comprises longitudinally separated, horizontal spring stubs 53, forming the ends of said projecting spring arms.

Wiper 51, which is of rubber or other like flexible material, comprises a shaped strip 54 or 54', which tapers to an anterior wiping edge 55 from a posterior end that is adapted to be connected to said mid-part of bilateral spring 48. With respect to spring length 52 as said mid-part, the posterior end of wiper 51 comprises wiper base 56; backed by rigid strip 57, this is connected to each spring length 52 of the plurality of bilateral springs 48 by fastenings 58 applied to it, said rigid strip and said spring lengths. With respect to stubs 53 as said mid-part, the posterior end of wiper 51 comprises slab 59; supported between rigid strips 60, this is connected between stubs 53 of each of the plurality of bilateral springs 48 by fastenings 61 applied to it, said rigid strips and said stubs.

Though spring arms 50 are oblique to spring ends 49, upon placement between new electrode plates 25 they retract into a profile that is collinear with spring ends 49, as shown in FIG. 1. In accordance with this condition, bilateral springs 48 occupy very little of the regular interplate distance, especially when spring length 52 constitutes the mid-part of said springs; moreover, only one wiper 51 contributes to the regular interplate distance, since the two wipers 51 of binary wiper structure 45 are longitudinally apart. The longitudinal separation is, nevertheless, compatible with complete wiping of electrode plates 25, because of the presence of terminal panels 33 on which each of the separated wipers 51 lands after passing a transverse end 31 of said electrode plates.

As electrode plates 25 are being used up and hence thin, spring arms 50 assume an increasingly oblique profile as they urge wiper 51 against the receding plate surface; simultaneously, the linear distance between spring ends 49 decreases. The change in linear distance is accommodated to by having said spring ends movable on backing strips 47. The latter for this purpose may be provided with oblong openings 62, in which fastenings 63 move freely in response to movement by spring ends 49, to which said fastenings are attached by their restraint in narrow openings 64 of said spring ends.

A complete, longitudinal wiping stroke may be divided into the factors of push and pull. These differ in their effect on a free-ended wiper spring, in that the push tends to cause it to bulge toward the electrode plate being wiped, and even to contact it at a close interplate distance. The spring is stabilized and the bulge avoided in the case of bilateral spring 48, since by its longitudinal symmetry it accepts similarly and equably both push and pull.

Electrode plate 25 being normally thicker than terminal panel 33, wiper 51 on its return stroke from said terminal panel is impeded by the confronting, transverse end 31 of said electrode plate. The impedance is overcome by the presence of protuberance 36, inasmuch as wiper 51 glides from terminal panel 33 to the summit of said protuberance and thence downward to transverse end 31 and the surface of electrode plate 25; the glide of wiper 51 is similar in the reverse transit from electrode plate 25 to terminal panel 33. The facilitation by gliding of the transit between electrode plate 25 and terminal panel 33 induced by protuberance 36 is maintained, if not enhanced, as said electrode plate thins in use.

Protuberance 36 serves, furthermore, to skim wiper 51 of adhering matter by the action of its summit on wiper 51 passing over it. The skimming is particularly effective in the case of prism 37, in view of the angularity of vertices 38.

Electrode plate 25 may be provided with bevel 65 at each of its transverse ends 31, as alternate to the employment of protuberance 36. Edge 66 of said bevel is in contact with transverse end 32 of terminal panel 33 and may be blurted to match the thickness of said terminal panel. The juxtaposition of bevel 65 and transverse end 32 forms a hollow across which wiper 51 may pass uniformly in both wiping directions. Transverse end 32 may, as required, be provided with bevel 67, the edge 68 of which is in contact with edge 66 of bevel 65. The juxtaposition of said edges forms another hollow across which wiper 51 may uniformly transit.

Bevel 65 provides for skimming of wiper 51 by the action of transverse end 31, though its edge protruding above the hollow between said transverse end and terminal panel 33.

Employed during electrolytic operation, wipers 51 may, particularly when electrode plates 25 are of iron, be applied also during electrolytic non-operation, the object being to mitigate corrosion of such plates that occurs when they are idle in water. The water may at the same time, or independently, be treated with a corrosion inhibitor, or for the inhibited removal of oxide which may have formed.

Terminal panels 33 instead of being dielectric may be of non-corrodible, electrically conducting material, such as an alloy of nickel-chromium-iron or titanium, or of a carbon composition. They are insulatingly separated from electrode plates 25 by the interposition of dielectric protuberance 36 or other suitable separation means.

Conducting terminal panels 33 may be placed in an electrolytic circuit in which they are alternately anodes and cathodes, oxygen or chlorine being generated at the anodes. Either gas may serve to oxidize ferrous hydroxide initially formed at electrode plate 25, or organic matter in the water, while the chlorine may serve also as a residual disinfectant.

For the similar purpose of generating oxygen or chlorine, conducting terminal panels 33 may be interconnected and placed in an electrolytic circuit in which they are anode to those electrode plates 25 which upon current reversal during operation will have become cathode.

During non-operation, conducting terminal panels 33 and electrode plates 25 may each be interconnected, and both placed in an electrolytic circuit in which said terminal panels are anode and said electrode plates are cathode. Electrode plates 25 during non-operation are thus cathodically protected from corrosion.

Alternate to said cathodic protection, electrode plates 25 may be protected from corrosion by operating normally at greatly reduced, reversing electrolytic current.

The various advantages of the apparatus and method will be understood from the description. It will be recognized that modifications may be made in particular parts and arrangements thereof that are within the skill of the art, and fall within the spirit and scope of the invention as claimed.

I claim:

1. An electrode comprised of a substantially rectangular metal plate for the anodic electrolytic production from the surface of said plate of a hydroxide of said metal substantially insoluble in an aqueous liquid for said electrode, said plate having a contact element of a conducting material substantially non-corrodible in said aqueous liquid fixed on an end thereof, said contact element adapted to make surface contact with a current lead-in for said electrode, whereby metal hydroxide production of said plate may proceed without resistance to the current supply thereto.

2. Claim 1, wherein the metal of said plate is selected from among iron and aluminum.

3. Claim 1, wherein said contact element is selected from among a nickel-chromium-iron alloy and a titanium alloy.

4. Claim 1, wherein said contact element comprises an embossment on said end.

5. Claim 1, wherein said contact element comprises an inlay to said end.

6. Claim 1, wherein said end less said and the opposite end are contact element coated with an insulating film.

7. Claim 6, wherein said insulating film extends across said ends to the adjacent margins of said plate.

8. Claim 6, in which said insulating film extends from said ends to the adjacent margins of said plate.

9. An electrolytic cell for the production of insoluble metal hydroxide from a metal thereof in which a part of the electrodes are comprised of substantially rectangular plates, each receiving current indirectly as a member of a series, the side ends of said plates being contained in insulating channels, said side ends being coated with an insulating film that is insoluble in water.

10. Claim 9, wherein said insulating film extends across said ends to the adjacent margins of said plate.

* * * * *